United States Patent [19]

Dumke et al.

[11] Patent Number: 5,614,041
[45] Date of Patent: Mar. 25, 1997

[54] PNEUMATIC TIRE WITH AN EXTERIOR ADDITIONAL LAYER ON THE TREAD STRIP FOR REINFORCING THE TREAD

[75] Inventors: Joachim Dumke, Lehrte; Andre du Bois, Hanover; Reinhard Teves, Seelze, all of Germany

[73] Assignee: Continental Aktiengesellschaft, Hanover, Germany

[21] Appl. No.: 323,274

[22] Filed: Oct. 14, 1994

[30] Foreign Application Priority Data

Oct. 15, 1993 [DE] Germany .................. 43 35 150.6

[51] Int. Cl.⁶ ...................... B60C 11/00; B60C 11/14
[52] U.S. Cl. .................. 152/210; 152/209 R; 152/211
[58] Field of Search ............ 152/209 R, 210–212, 152/167–168, 187–188

[56] References Cited

U.S. PATENT DOCUMENTS

| | | | |
|---|---|---|---|
| 585,615 | 6/1897 | Bagot | 152/209 R |
| 603,161 | 4/1898 | Bagot | 152/209 R |
| 1,037,311 | 9/1912 | Pratt | 152/209 R |
| 1,038,441 | 9/1912 | Rose | 152/168 |
| 1,111,419 | 9/1914 | Wadsworth | 152/211 |
| 1,301,343 | 4/1919 | Waterman | 152/209 R |
| 1,746,948 | 2/1930 | King | 152/209 R |
| 2,274,855 | 3/1942 | Wallace | 152/209 R |
| 2,445,725 | 7/1948 | Walker | 152/209 R |
| 2,513,064 | 6/1950 | Solomon et al. | |
| 2,710,042 | 6/1955 | Gates, Jr. | 152/211 |
| 2,756,799 | 7/1956 | Pfeiffer | |
| 2,767,759 | 10/1956 | Neuschel | 152/211 |
| 2,774,409 | 12/1956 | Skidmore | 152/167 |
| 2,819,751 | 1/1958 | Frary et al. | 152/211 X |
| 3,062,696 | 11/1962 | Riehl | 152/209 R |
| 3,111,975 | 11/1963 | Sanders et al. | 152/209 R |
| 3,283,053 | 11/1966 | Felker | 152/211 |
| 3,462,328 | 8/1969 | Buckland | 152/209 R |
| 4,290,470 | 9/1981 | Williams et al. | 152/209 R |
| 4,340,103 | 7/1982 | Nilsson | 152/209 R |
| 4,349,061 | 9/1982 | Hirakawa et al. | 152/209 R |

FOREIGN PATENT DOCUMENTS

| | | | |
|---|---|---|---|
| 1365406 | 5/1964 | France | 152/211 |
| 1194721 | 6/1960 | Germany . | |
| 1900114 | 3/1964 | Germany . | |
| 1480981 | 3/1965 | Germany . | |
| 2052298 | 4/1972 | Germany . | |
| 2402639 | 7/1974 | Germany | 152/212 |
| 4125978 | 10/1992 | Germany . | |
| 4133803 | 5/1972 | Japan | 152/209 R |
| 60-131304 | 7/1985 | Japan | 152/209 R |
| 61-119409 | 6/1986 | Japan | 152/209 R |
| 63-170106 | 7/1988 | Japan | 152/210 |
| 2170841 | 7/1990 | Japan | 152/210 |
| 1244133 | 8/1971 | United Kingdom . | |

*Primary Examiner*—Adrienne C. Johnstone
*Attorney, Agent, or Firm*—Robert W. Becker & Associates

[57] ABSTRACT

A pneumatic vehicle tire has a carcass with reinforcing members and radially inwardly positioned beads and a tread strip with a tread positioned radially outwardly on the carcass. An additional layer is placed on the tread strip for reinforcing the tread. The additional layer is made of a rubber or thermoplastic material. The additional layer has a tensile modulus of elasticity that is greater than the tensile modulus of elasticity of the tread strip. The additional layer is provided with reinforcement elements.

5 Claims, 8 Drawing Sheets

PNEUMATIC TIRE WITH AN EXTERIOR ADDITIONAL LAYER ON THE TREAD STRIP FOR REINFORCING THE TREAD

BACKGROUND OF THE INVENTION

The present invention relates to a pneumatic tire, especially a pneumatic vehicle tire, comprised of a carcass with reinforcing members and radially inwardly positioned beads and a profiled tread strip applied onto the carcass whereby onto the tread strip an additional layer for reinforcing the tread is applied.

The tread of such pneumatic tires should ensure as much as possible under any weather conditions optimal performance (driving properties) of the tire.

Tread strip compositions are known which are soft and can thus adapt easily to the road surface. Accordingly, the corresponding tread strips have a better traction on the road surface than tread strips made of a hard composition. During driving (i.e., rolling on the road surface) the soft tread blocks and/or tread grooves are bent and/or tilted so that the contact surface area of the tire tread in contact with the road surface is reduced.

With the prior art concepts this problem could not be solved sufficiently.

Known in the prior art are, for example, additional layers made of rubber which are applied to the tread surface of the green tire and are formed together with the green tire. Such additional layers are comprised of rubber mixtures that during vulcanization due to their viscous flow properties cover the flanks of the tread only partially and in thin layers in the main flow directions. For example, German Offenlegungsschrift 1 480 981 discloses an additional layer made of a hard and wear-resistant (abrasion-proof) mixture that is supposed to harden the upper edges of the tread blocks in order to cut into grease films (slippery coatings) on road surfaces. However, this embodiment does not result in a reinforcement of the entire tread block due to the aforementioned flow behavior of the rubber mixtures.

It is furthermore known to reinforce tread strip mixtures with short fibers of different materials such as rayon, polyester, polyamide, or aramide (German Gebrauchsmuster 1 900 114). A disadvantage of such mixtures is a very low wear resistance (abrasion resistance) of the tread surface.

In order to avoid these disadvantages, it is an object of the present invention to improve the performance of pneumatic tires, especially their traction, by effectively stabilizing the tread blocks and/or tread grooves.

SUMMARY OF THE INVENTION

This object is solved by providing an additional layer comprised of rubber or a thermoplastic material that has a higher tensile modulus of elasticity than the tread strip positioned underneath and that contains reinforcement elements.

The pneumatic vehicle tire of the present invention is primarily characterized by:

A carcass with reinforcing members and radially inwardly positioned beads;

A tread strip with a tread, the tread strip positioned radially outwardly on the carcass;

An additional layer placed on the tread strip for reinforcing the tread;

The additional layer made of a substance selected from the group of rubber and thermoplastic;

The additional layer having a tensile modulus of elasticity greater than a tensile modulus of elasticity of the tread strip; and The additional layer comprising reinforcement elements.

Preferably, the additional layer has a thickness that is 0.05 to 0.3 times a thickness of the tread strip.

Advantageously, the tread strip is comprised of a porous material.

Preferably, the reinforcement elements of the additional layer have a shape selected from the group consisting of fibers, wires, cords, and sections of such fibers, cords, and wires, the reinforcement elements comprised of a heat-resistant and deformable material selected from the group of organic material, inorganic material, and a mixture of organic and inorganic materials.

Advantageously, the reinforcement elements in the shape of section of fibers wires, or cords have a length that is 0.25 to 5 times a depth of the tread.

Preferably, the reinforcement elements in the shape of fibers, wires, or cords in the unvulcanized state of the additional layer are arranged in a grouping selected from the group of a compressed arrangement, a zigzag arrangement, an irregular arrangement, and a combination of the compressed arrangement and the zigzag arrangement, and a combination of the compressed arrangement and the irregular arrangement Expediently, the additional layer further comprises at least one unvulcanized rubber core about which the reinforcement elements in the shape of fibers, wires, or cords are wound.

Advantageously, the additional layer contains inorganic particles selected from the group of corundum, silicon dioxide, glass, and a mixture of at least two of said corundum, silicon dioxide, and glass.

Preferably, the tread comprises a contact surface for contacting the road and the additional layer is removed from the contact surface.

The present invention also relates to a method of manufacturing an additional layer for reinforcing a tread of a pneumatic vehicle tire, wherein a tread strip with a tread is positioned radially outwardly on the carcass of the pneumatic vehicle tire and wherein the additional layer is placed on the tread strip for reinforcing the tread and wherein the additional layer has a tensile modulus of elasticity greater than a tensile modulus of elasticity of the tread strip, the inventive method primarily characterized by the following steps:

Providing sheets of a substance selected from the group of unvulcanized rubber and thermoplastic;

Providing reinforcement elements; and

Embedding the reinforcement elements between the sheets of the substance to form the additional layer.

Preferably, the method further comprises the step of arranging the reinforcement elements in a zigzag arrangement between the sheets.

Advantageously, the method further comprises the steps of:

Guiding two of the sheets of unvulcanized rubber into a nip between calender rollers;

Feeding the reinforcement elements through a reciprocating guiding device; and

Placing with the reciprocating guiding device the reinforcement elements between the two sheets of unvulcanized rubber.

Preferably, the method further comprises the step of reciprocating the reciprocating guiding device horizontally and/or vertically.

Expediently, the method further comprises the step of folding the additional layer to a zigzag arrangement by guiding the additional layer through two toothed rollers.

Preferably, the method further comprises the step of compressing the zigzag arrangement by guiding the additional layer through pairs of rollers rotating at a speed slower than the toothed rollers, wherein each pair of rollers downstream of another pair of rollers rotates at a speed slower than the upstream pair of rollers.

Preferably, the method in an alternative embodiment comprises the steps of folding the additional layer by guiding the additional layer through pairs of rollers, wherein each pair of rollers downstream of another pair of rollers rotates at a speed slower than the upstream pair of rollers.

Advantageously, the method further comprises the step of arranging the reinforcement elements in an irregular arrangement between the sheets.

The present invention further relates to a method of manufacturing an additional layer for reinforcing a tread of a pneumatic vehicle tire, wherein a tread strip with a tread is positioned radially outwardly on the carcass of the pneumatic vehicle tire and wherein the additional layer is placed on the tread strip for reinforcing the tread and wherein the additional layer has a tensile modulus of elasticity greater than a tensile modulus of elasticity of the tread strip, the inventive method primarily characterized by the steps of:

Mixing reinforcement elements into a substance selected from the group of unvulcanized rubber and thermoplastic for forming the additional layer.

Preferably, the method further comprises the step of forming the additional layer simultaneously to or after the step of mixing.

In yet another embodiment of the inventive method of manufacturing an additional layer for reinforcing a tread of a pneumatic vehicle tire, wherein a tread strip with a tread is positioned radially outwardly on the carcass of the pneumatic vehicle tire and wherein the additional layer is placed on the tread strip for reinforcing the tread and wherein the additional layer has a tensile modulus of elasticity greater than a tensile modulus of elasticity of the tread strip, is primarily characterized by the following steps:

Providing an unvulcanized rubber core;

Providing reinforcement elements;

Winding the reinforcement elements about the rubber core to produce a reinforced core member; and Applying at least one of the reinforced core members to the tread strip of an unvulcanized pneumatic vehicle tire to form the additional layer.

With the inventive additional layer it is possible to effectively reinforce the flanks of the tread blocks and tread grooves. When forming (molding) this additional layer together with the green tire, the reinforcement elements embedded in the additional layer are forced or pressed into the flanks of the tread. Thus, along the entire surface of the flanks of the tread a reinforcement is provided which reduces a bending action of the tread blocks and/or tread grooves.

In contrast to the prior art with the inventive solution provides a uniform reinforcement relative of the tread blocks/grooves down to the base of the tread. In contrast to previous solutions of the prior art, for example, German Offenlegungsschrift 1 480 981, the rubber composition of the additional layer is only of minor importance because the stabilization (reinforcement) of the tread blocks and grooves is achieved with the reinforcement elements embedded in the additional layer which reinforcement elements have a stiffening effect on the flanks of the tread. The embedding of the reinforcement elements in rubber or thermoplastic material is advantageous because the reinforcement elements can be applied to the green tire in a defined manner and during the forming step a fixed bonding between the reinforcement elements and the flanks of the tread of the tread strip can be achieved. The tensile modulus of elasticity of the inventive additional layer is greater than the tensile modulus of elasticity of the tread strip of the tire positioned underneath the additional layer.

It has been proven to be especially advantageous when the inventive additional layer for reinforcing the flanks of the tread has a thickness of 0.05 to 0.3 times the thickness of the tread strip.

This results in a sufficient reinforcement of the flanks of the tread and at the same time the expenditure for removing the additional layer from the contact surface of the tread is relatively low. The removal of the additional layer from the contact surface is advantageous because due to the embedded reinforcment elements of the additional layer the traction would be reduced while at the same time wear would be increased. Based on these properties of the additional layer, it is thus also possible to remove the additional layer from the contact surface simply during driving.

A further advantageous embodiment of the inventive pneumatic vehicle tire suggests to use a material for the tread strip that is porous. When after completion of manufacturing the tire, i.e., after completion of molding (forming), the additional layer containing reinforcement elements for reinforcing the tire tread is removed from the contact surface of the tread, the advantageous properties of a soft contact surface, respectively, a soft tread with respect to traction on the road surface are combined with the advantageous properties of a stable tread block. The application of the inventive additional layer is in no way limited to a particular rubber and/or thermoplastic composition of the tread strip mixture, i.e., it is possible to use any desired mixture for the tread strip in combination with the inventive additional layer.

In order to achieve optimal reinforcing properties, it is especially advantageous that the additional layer has embedded therein reinforcment elements in the form of organic and/or inorganic, heat-resistant, deformable fibers, cords, or wires or sections of such shapes. The reinforcement elements can be made of different materials, for example, aramid, polyester, rayon, steel, or glass. It is also advantageous in this context to use, for example, bristles or hair. The reinforcement elements, however, must survive without being damaged the forming (molding) process of the green tire.

At the same time, the reinforcment elements must conform to the contour of the flanks of the tread blocks and grooves. The aforementioned materials optimally fulfill such requirements.

The length of the sections of the aforedescribed shapes of the inventively used reinforcment elements should be in the range of 0.25 to 5 times the depth of the tread so that an optimal stiffening of the flanks of the tread blocks and/or grooves can be achieved.

The fiber-, cord-, and/or wire-shaped reinforcement elements (this does not relate to sections thereof), in the additional layer are arranged advantageously in a compressed and zigzag arrangement or in a compressed and irregular arrangement.

A compressed arrangement of the reinforcement elements refers in the context of the present invention to reinforcement elements the structure of which has been compressed by applying of force. In this context it is of no consequence whether the reinforcement elements have a regular (compressed zigzag arrangement) or an irregular structuring. It is only important that the reinforcement elements during the forming (molding) process are able to straighten and conform to the contour of the flanks of the tread.

For structuring and/or compressing of the reinforcement elements which have been embedded between unvulcanized rubber or thermoplastic layers, a method is suggested according to which the additional layer comprised of rubber sheets or thermoplastic sheets with reinforcement elements embedded therebetween is guided through two toothed rollers in order to provide a zigzagged arrangement to the additional layer and/or is folded and compressed by guiding the additional layer through pairs of rollers whereby the force of the rollers which rotate at different speeds provides for the folding and compressing action. With such a structuring a woven-structured reinforcement element is provided which is doubled with unvulcanized rubber or thermoplastic material sheets and which can be formed easily. With the inventively disclosed device it is also possible to structure the individual reinforcement element or reinforcement element arrays or reinforcement element fabrics.

A further embodiment of the invention suggest to embed the reinforcement elements into the additional layer in a zigzag arrangement. In order to be able to achieve such a structuring, at the nip of two calender rollers the reinforcement element is moved back and forth and/or up and down with a reciprocating guiding device (for example, a wedge). At the same time the thermoplastic material or the unvulcanized rubber fixes the generated structure of the reinforcement elements since the reinforcement elements are doubled in the calender. This has the advantage that the structuring and embedding of the reinforcement elements into the additional layer can be achieved in a single operating step.

In the context of the present invention an irregular arrangement of the reinforcement elements refers to reinforcement elements that extend randomly in any direction. With such a structure a loose arrangement of reinforcement elements is generated. Reinforcement elements of such an irregular arrangement can also be embedded between thermoplastic or unvulcanized rubber sheets.

In principle, it is, of course, also possible to mix the reinforcement elements into the additional layer of unvulcanized rubber or thermoplastic material by mixing the reinforcement elements into the unvulcanized rubber or thermoplastic material during rolling (forming) of the additional layer (calendering) or previous to the forming (rolling or calendering) step.

A further advantageous embodiment of the invention suggests that the reinforcement elements are wound about an unvulcanized rubber core whereby the reinforcement elements are in the form of fibers, cords, or wires applied to the rubber core. The rubber core is essentially a rubber body that can have the shape of a rod, a layer, or a spiral.

The reinforcement elements can be coated with a rubber sheathing. However, it is also possible to use non-rubberized reinforcement elements for winding about the rubber core. The resulting reinforced core member is applied to the tread strip of an unvulcanized green tire.

The inventive additional layer can be applied as a whole (a strip or sheet) to the tread strip. However, it is also possible to apply individual pieces or sections of such an additional layer in an areal arrangement onto the tread strip.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
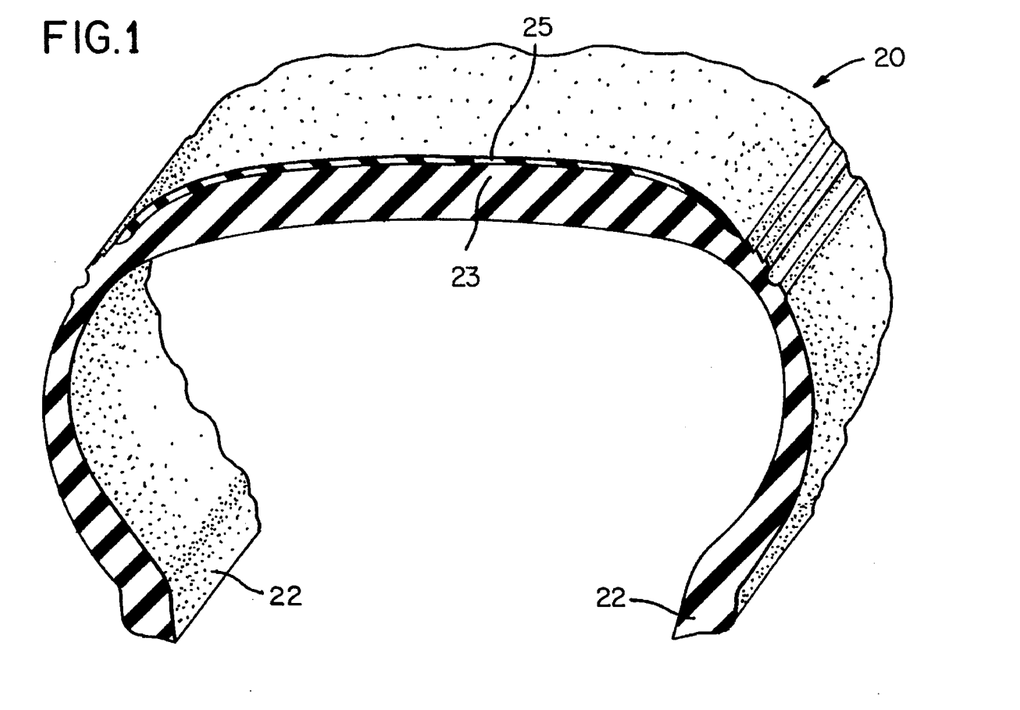
FIG. 1 shows a schematic perspective representation of a section of an unvulcanized pneumatic tire which is comprised of a carcass and a tread strip onto which the additional layer is applied.
Figure 2:
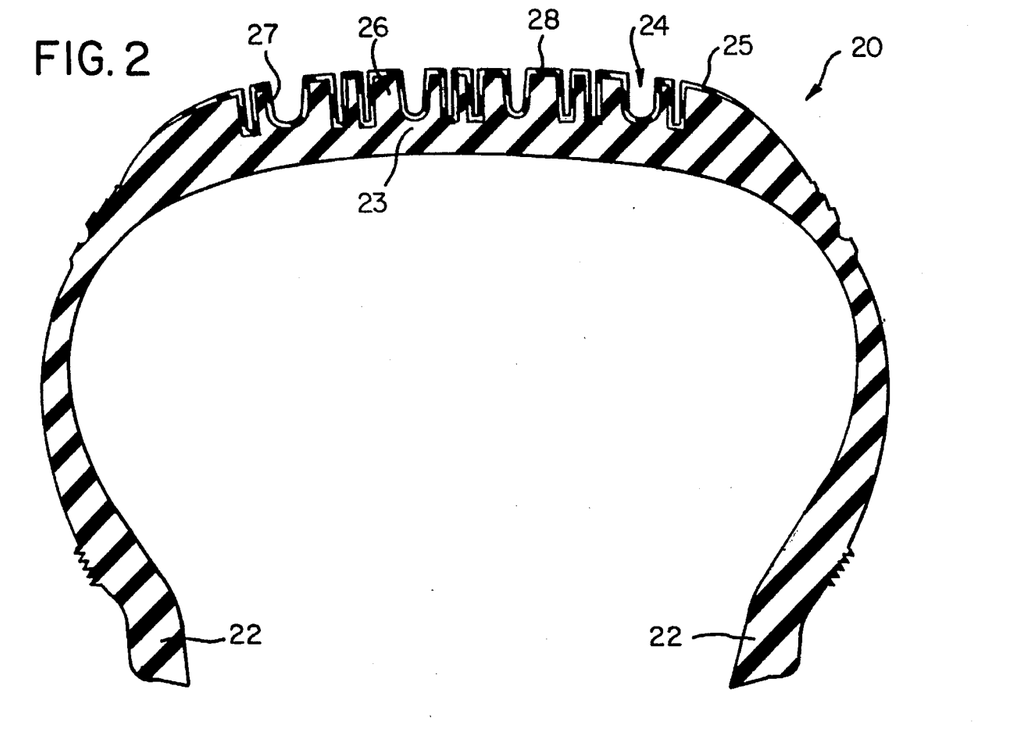
FIG. 2 shows a schematic representation of a section of a vulcanized pneumatic tire with the additional layer for reinforcing the tread having been applied before molding in the vulcanization mold.
Figure 2A:
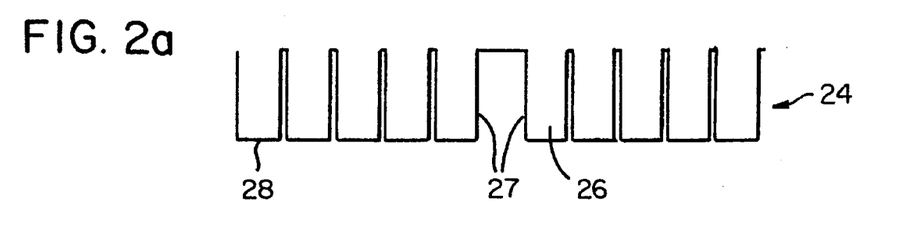
FIG. 2a shows a schematic representation of a section of tread blocks of a tire tread of a vulcanized pneumatic tire with the additional layer for reinforcing the tread under driving conditions.
Figure 2B:
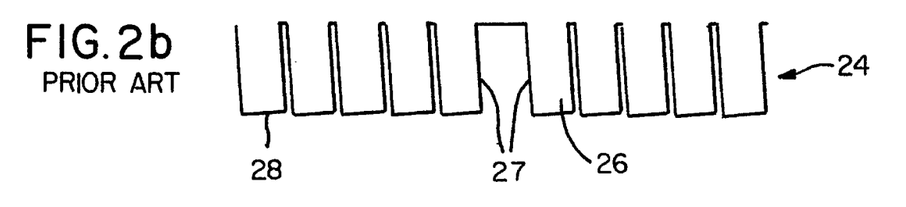
FIG. 2b shows a schematic representation of a section of the tread blocks of a tire tread of a vulcanized pneumatic tire without the additional layer for reinforcing the tread under driving conditions.

The present invention will now be described in detail with the aid of several specific embodiments utizilizing FIGS. 1 through 14, The pneumatic vehicle tire 20 schematically represented in FIG. 1 is substantially comprised of a non-represented carcass with radially inwardly positioned beads 22 onto which carcass a tread strip 23 is applied radially outwardly. Onto the tread strip 23 an additional layer 25 is applied. The tread strip 23 in conventional tires comprises a tread 24 comprised of tread blocks 26 as shown in FIG. 2a. FIG. 2b illustrates the state of the tread 24 during driving. Under driving conditions the tread blocks 26 are frequently bent or tilted up to the point of folding over so that traction on the road surface can be lost.

During forming (molding) and profiling of the pneumatic vehicle tire 20 in a non-represented vulcanization mold the additional layer 25 is formed about the tread blocks 26 such that the flanks 27 of the tread blocks 26 and the contact surface 28 of the tread of the tire are covered. This continuous covering of the tread 24 with the additional layer 25 remains after the molding step (as shown in FIG. 2).

Figure 3:
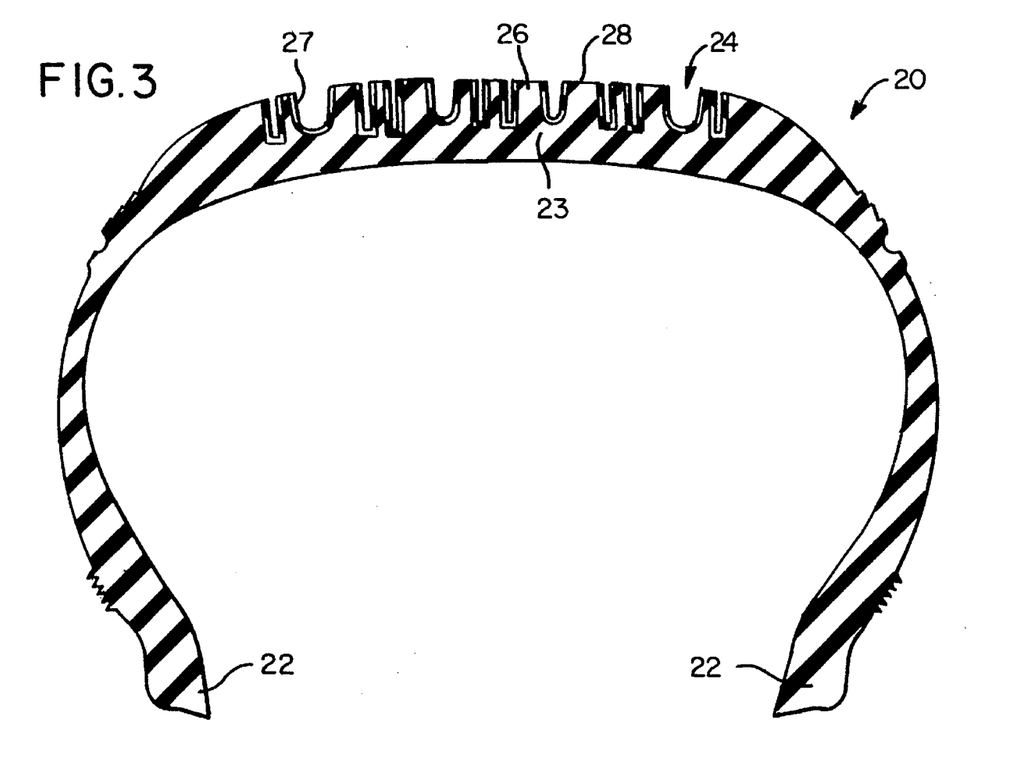
FIG. 3 shows a schematic representation of a section of a pneumatic tire according to FIG. 2 with the additional layer for reinforcing the tire tread being removed from the contact surface of the tire tread.

In order to provide for an optimal road contact of the pneumatic vehicle tire 20, the additional layer 25 is removed from the tread contact surface 28 of the tread blocks 26 after completion of molding, as represented in FIG. 3. The pneumatic vehicle tire 20 thus has a contact surface 28 that provides sufficient traction on the road surface. The removal of the additional layer 25 (according to FIG. 2) can be achieved by grinding or simply by using the tire so that the additional layer 25 is worn off. FIG. 3 shows a pneumatic vehicle tire 20 after removal of the additional layer 25 (represented in FIG. 2) from the contact surface 28. After the removal of the additional layer 25 a tread profile 24 remains which is stiffened by the additional layer 25 in the area of the flanks 27 of the tire tread, i.e., stiffened substantially vertical to the nonrepresented road surface. The tread blocks 26 themselves have a contact surface 28 freed from the additional layer 25 that can be removed by grinding etc.

Figure 4:
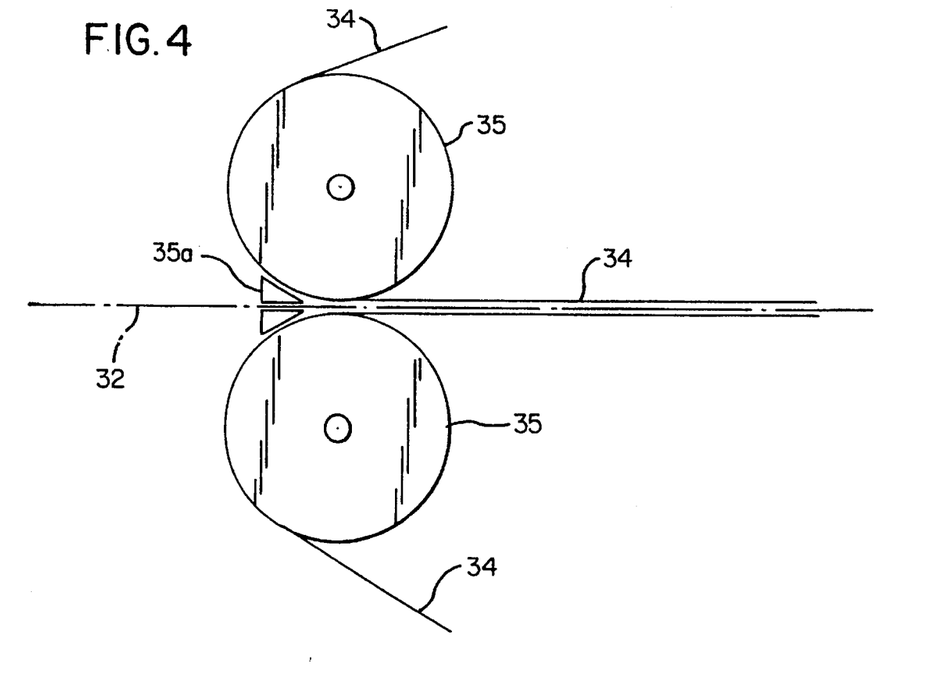
FIG. 4 shows a schematic representation of the manufacture of the additional layer containing reinforcement elements in a zigzag arrangement for reinforcing the tire tread.

FIG. 4 shows schematically the coating of a reinforcement element 32 with two rubber or thermoplastic sheets 34. For this purpose, two individual rubber or thermoplastic sheets 34 are pressed against one another by calender rollers 35. Between two rubber or thermoplastic sheets 34 a reinforcement element 32 is embedded which is introduced between the two sheets 34 by a reciprocating guiding device 35a (for example, a wedge) in a zigzag arrangement. With the device represented in FIG. 4 a construction of an inventive additional layer 25 is produced as represented in FIG. 6.

Figure 5A:
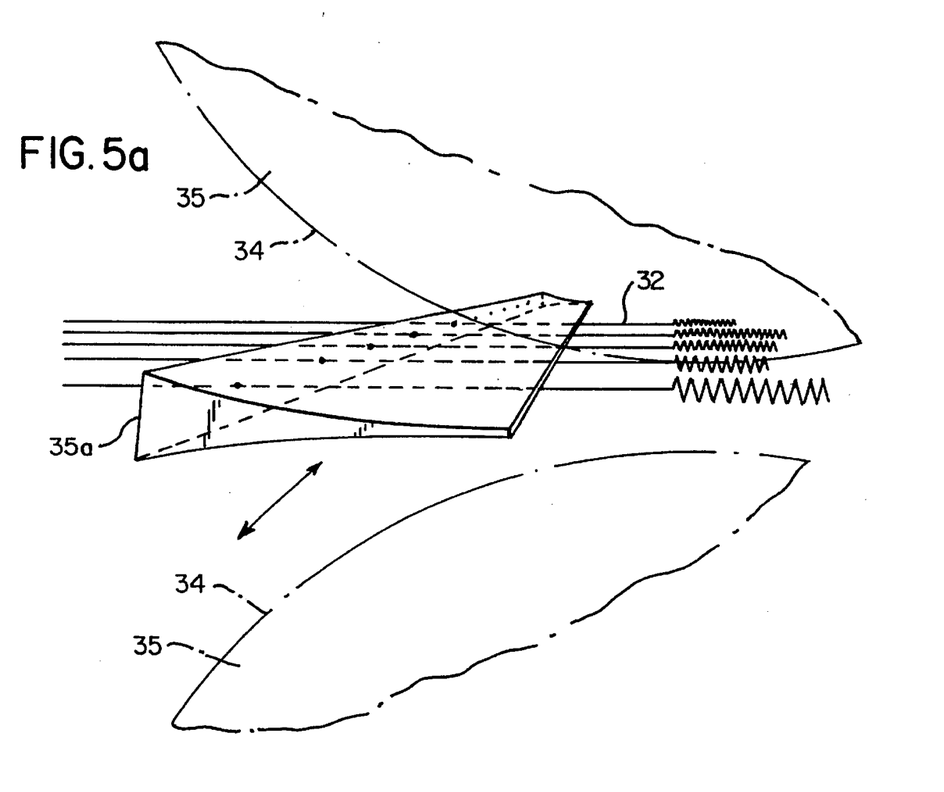
FIGS. 5a–5c show in a schematic representation the manufacture of the additional layer for reinforcing tire treads, in which a plurality of reinforcement elements is arranged in a zigzag arrangement.
Figure 5B:
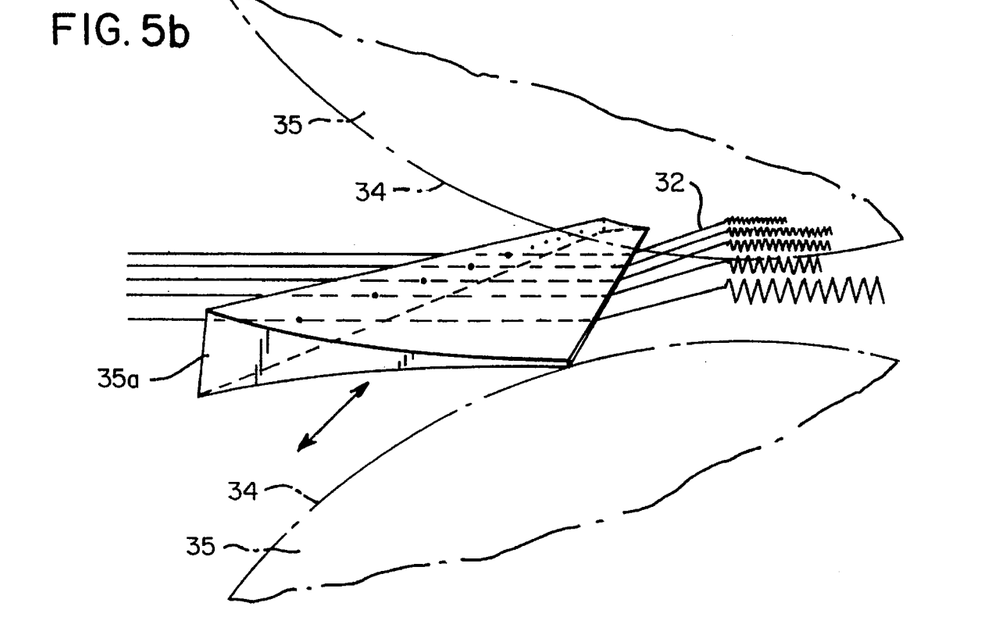
Figure 5C:
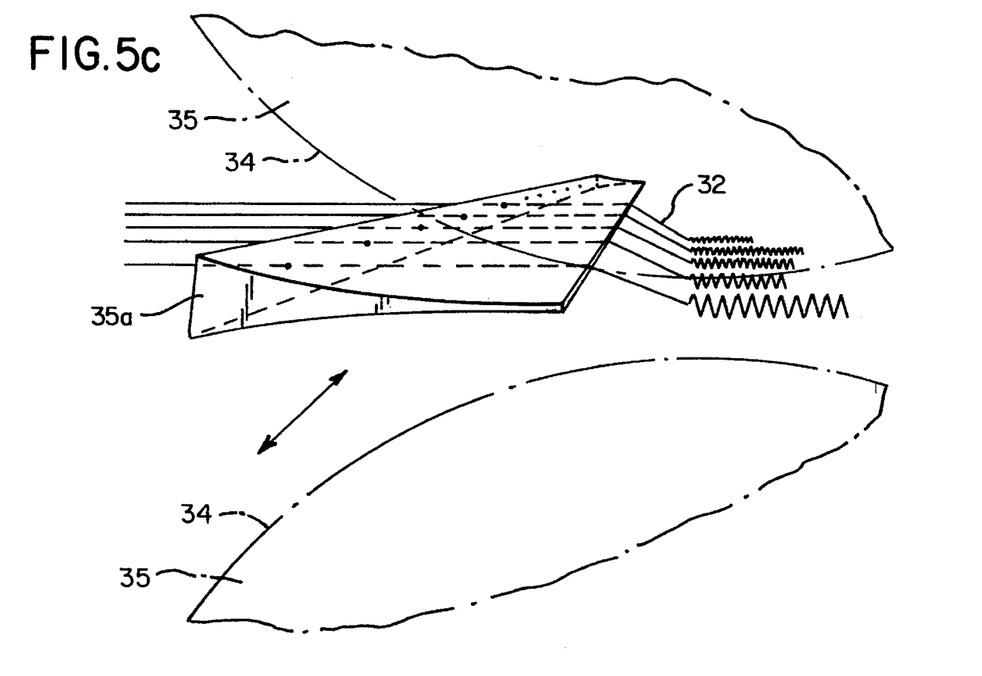

An alternative method for producing an additional layer 25 with reinforcement elements 32 positioned between two rubber or thermoplastic sheets is shown in FIGS. 5a to 5c in a schematic representation. In contrast to the method of FIG. 4 a plurality of reinforcement elements 32 can be simultaneously introduced between the two rubber or thermoplastic layers 34 with the reciprocating guiding device 35a. Due to the reciprocating movement of the guiding device 35a which corresponds substantially to the movement of FIG. 4, a zigzag arrangement is again imparted to the reinforcement elements 32.

The reciprocating guiding device 35a of FIGS. 4 and 5 can also be moved in other spatial directions (i.e., a combination of horizontal and vertical movements) so that no longer an ordered zigzag arrangement of the reinforcement elements results. However, reinforcement elements structured by such irregular movements can also be used as an inventive additional layer.

Figure 6:
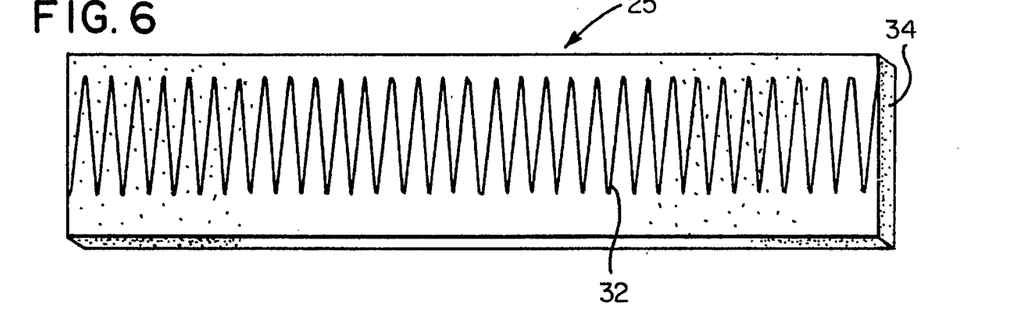
FIG. 6 shows a schematic representation of a section of an additional layer for reinforcing a tire tread at the level of the reinforcement elements embedded between two rubber or thermoplastic sheets, whereby the reinforcement elements are arranged in a zigzag arrangement according to the method of FIG. 4.

FIG. 6 shows in section the reinforcement elements 32 embedded in a rubber or thermoplastic sheet 34 in a zigzag arrangement. The manufacture of such an arrangement is illustrated in FIG. 4. Such an additional layer is applied to an unvulcanized green tire and is formed (molded) together with the green tire in the vulcanization mold.

Figure 7:
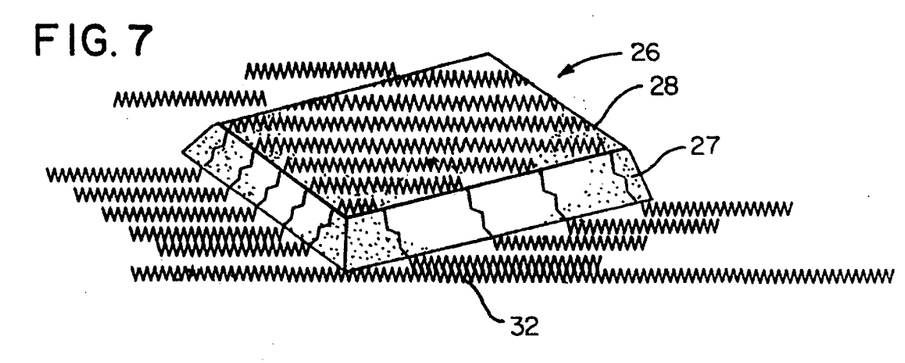
FIG. 7 shows in a schematic representation a section of a tread block of the tread surface of a pneumatic tire with an additional layer applied thereto which additional layer contains reinforcement elements which are arranged in a zigzag arrangement according to the methods of FIGS. 4 or 5.

The reinforcement element 32 arranged in a zigzag arrangement is straightened or stretched during forming of the tread 24, as represented in FIG. 7, along the flanks 27 of the tread blocks 26. The contact surface 28 of the tire is covered by the reinforcement elements 32. The reinforcement element or elements 32 are embedded in rubber or thermoplastic sheets 34, as shown in detail in FIG. 6.

Figure 8:
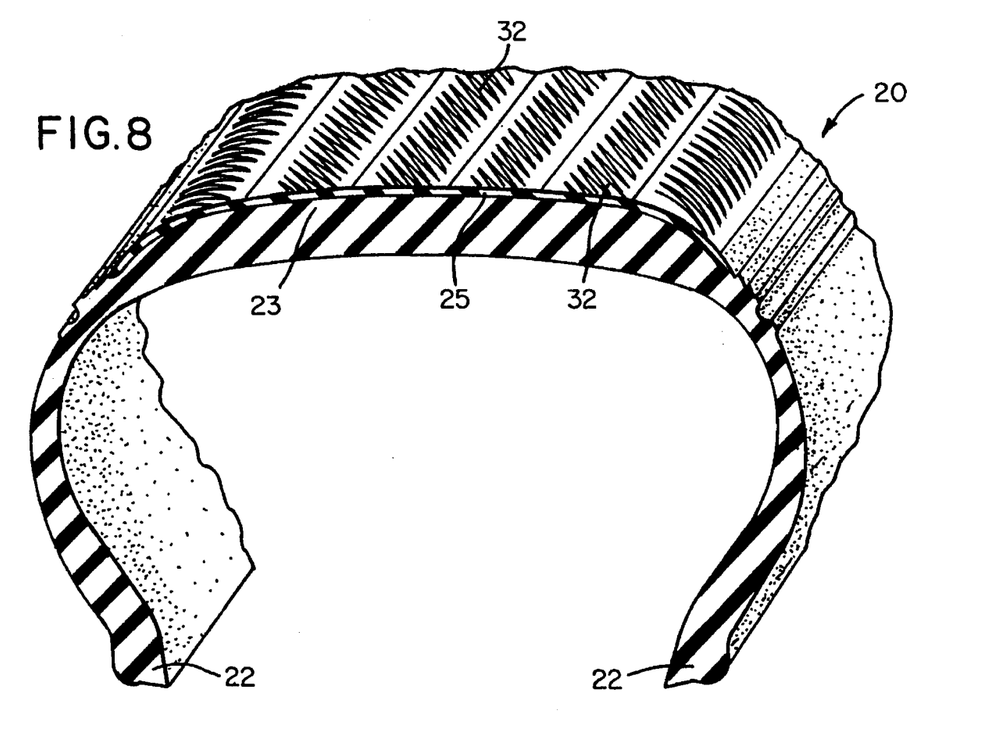
FIG. 8 shows a schematic perspective representation of a section of an unvulcanized tire with a carcass and a textile reinforcement element layer in a which may be embedded in an zigzag arrangement additional layer made of rubber of thermoplastic material.

FIG. 8 shows a pneumatic tire according to FIG. 1 onto which an additional layer 25 is placed. The additional layer 25 contains reinforcement elements 32 that are, as shown in FIG. 6, embedded in the additional layer 25. In this context it is of no consequence in which direction the reinforcement elements 32 extend within the additional layer 25.

Figure 9:
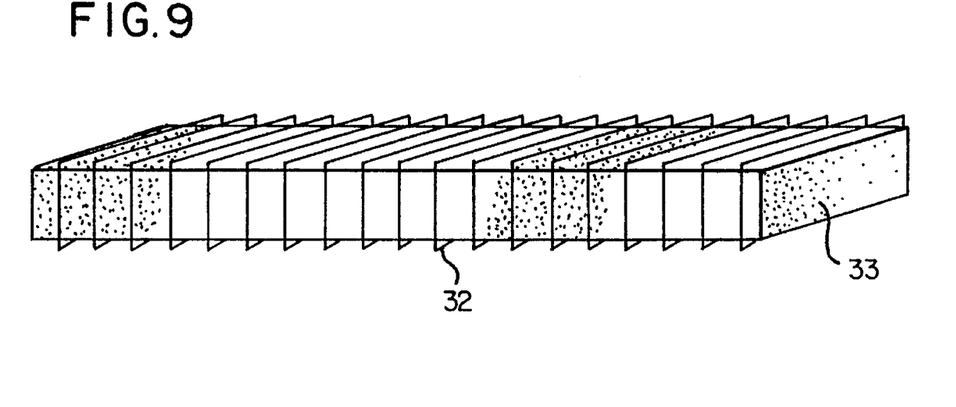
FIG. 9 shows a schematic representation of a reinforcement element wound about a rubber core as a further option for manufacturing an additional layer for reinforcing the tire profile.
Figure 10A:
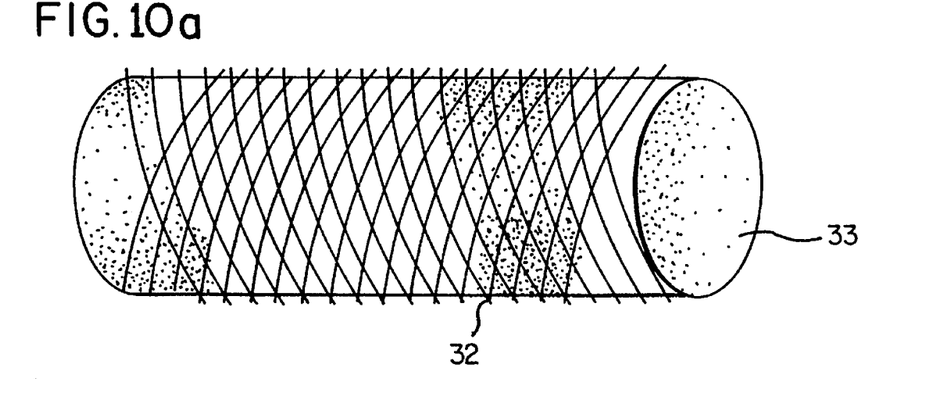
FIGS. 10a & 10b show a schematic representation of a reinforcement element wound about a rubber rod whereby the reinforcement element is applied in a crossed arrangement in a stretched (FIG. 10b) and non-stretched (FIG. 10a) state as a further option for manufacturing an additional layer for reinforcing the tire tread.
Figure 10B:
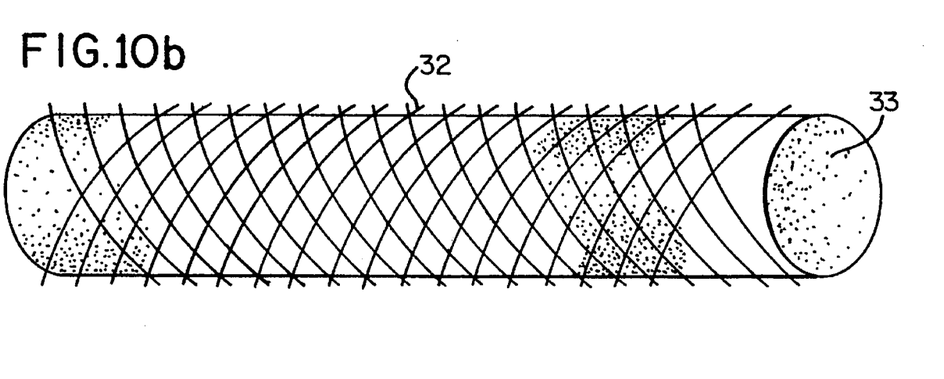

FIGS. 9, 10a and 10b show further embodiments of an additional layer 25 containing one or more reinforcement elements 32. In this embodiment, one or more reinforcement elements 32 are wound about a core in the form of rods 33 resulting in a reinforced core member. The rods 33 can be made of non-vulcanized rubber or of a thermoplastic material. The reinforcement elements 32 are arranged in a crossed arrangement. However, it is also possible to conceive of other winding arrangements. FIG. 10b illustrates the stretched state of the rubber or thermoplastic rod (core) with wound reinforcement elements of FIG. 10a. The stretched state results when the rubber or thermoplastic rod about which the reinforcement elements 32 are wound is applied to the tread strip of a pneumatic tire and forced onto the flanks of the tire tread during molding in the vulcanization mold.

Figure 11A:
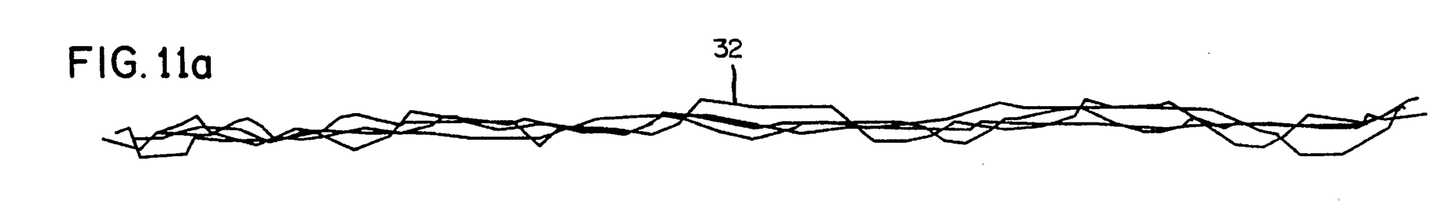
FIGS. 11a–11c show schematic representations of irregular arrangements of reinforcement elements in different stretched states to be embedded into an additional layer.
Figures 11B, 11C:
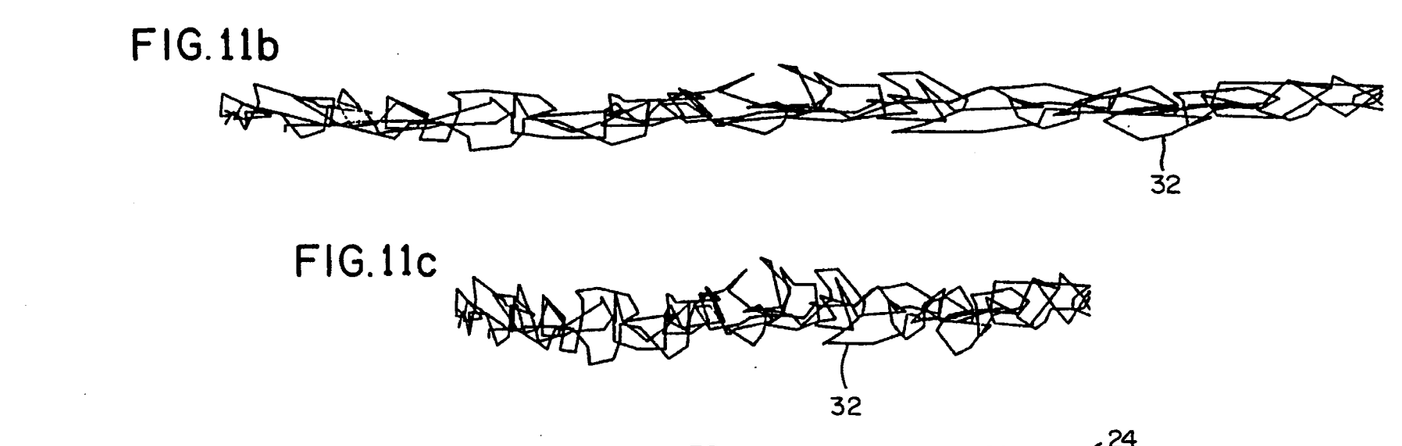
Figure 12:
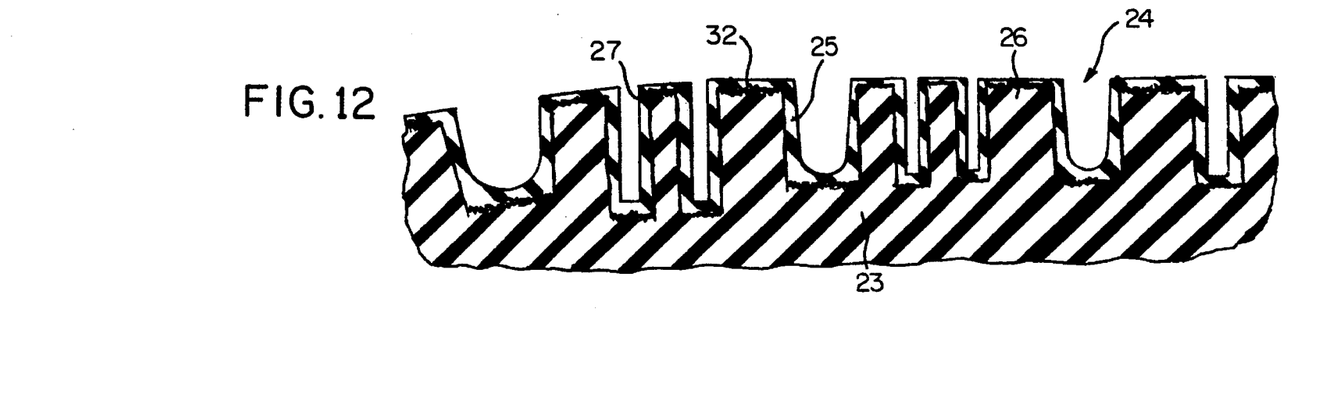
FIG. 12 shows a schematic representation of a section of an additional layer applied to a tire tread for reinforcing the tire tread whereby the reinforcement elements before forming (molding) of the green tire have been in an irregular arrangement and due to the forming (molding) step have been stretched and pressed onto the flanks of the tire tread.

A further embodiment of structuring the reinforcement elements 32 is realized by arranging the reinforcement elements in an irregular arrangement as shown in FIGS. 11a, 11b, and 11c. For the desired reinforcing effect of the flanks 27 of the tread blocks 26, represented in FIG. 12, a variation of the structuring of the embodiments of FIGS. 11a to 11c is advantageous. Such irregular structures of the reinforcement elements 32 according to FIGS. 11a to 11c allows for the molding of the additional layer 25 onto the tread 24 according to FIG. 12. The reinforcement elements 32 which are arranged in an irregular arrangement are essentially detangled along the flanks 27 of the tread blocks 26. This results in a stiffening of the flanks 27 of the tread blocks 26.

Figure 13:
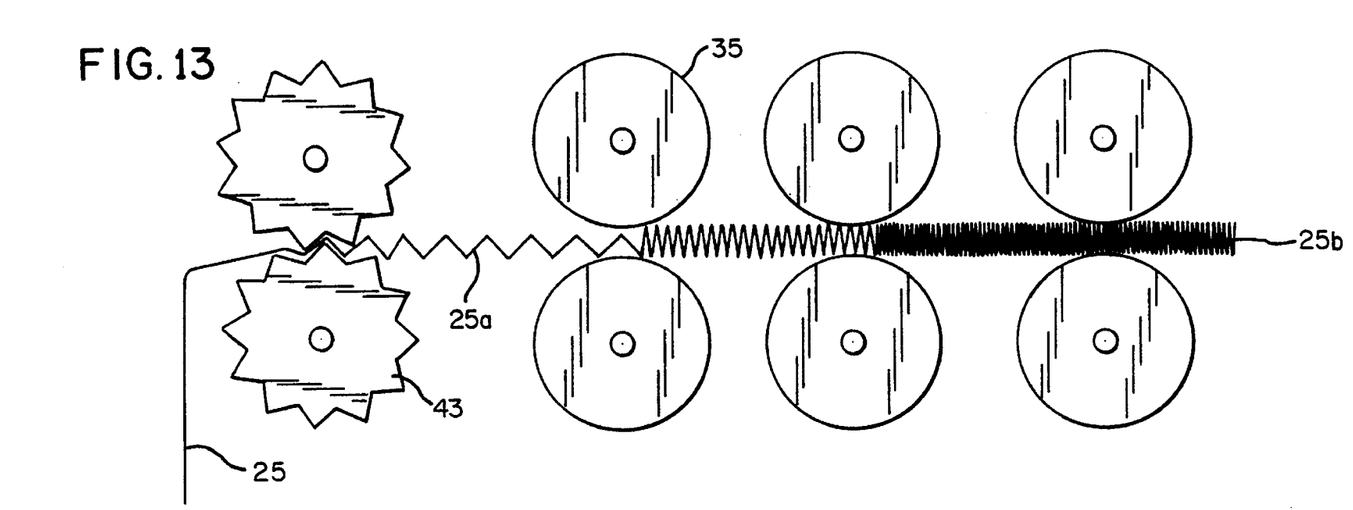
FIG. 13 shows a schematic representation of the manufacture of a structured and compressed reinforcement element embedded in an additional layer.
Figure 14:
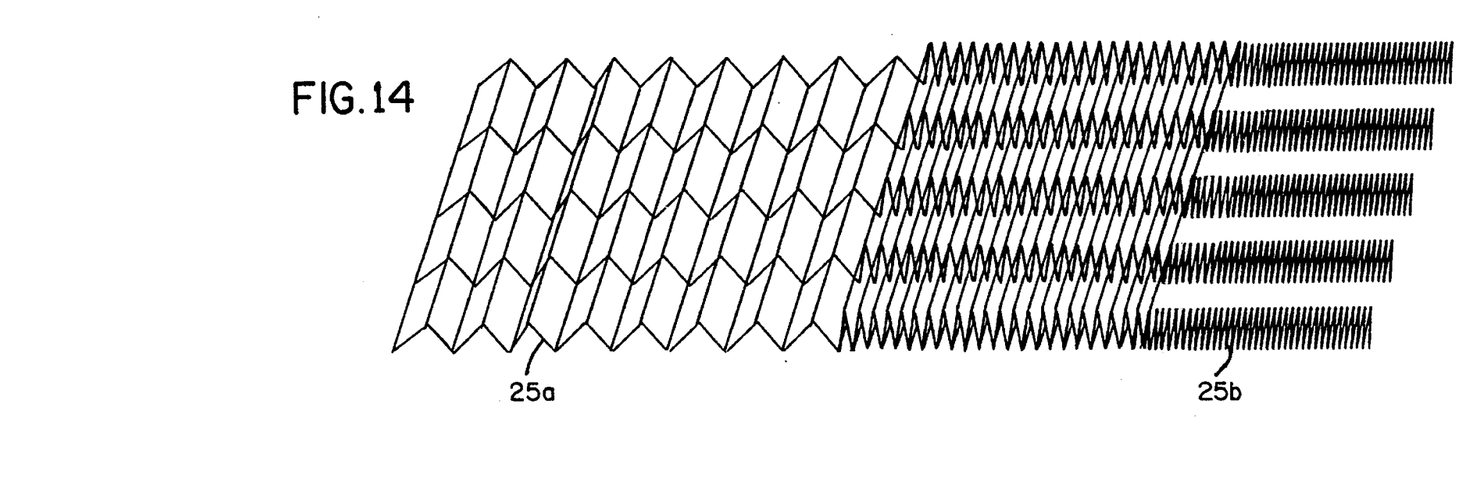
FIG. 14 shows a schematic representation of the structured and compressed reinforcement elements of FIG. 13 embedded in an additional layer.

According to the device of FIG. 13 an additional layer 25 can be produced that is represented in FIG. 14. An additional layer 25 containing reinforcement elements is produced in the form of a folded structure 25a with a structuring roller 43 and subsequently transformed into a compressed state 25b by being guided through pairs of rollers 35 that operate at varying speeds. The result of such a treatment with the device according to FIG. 13 is represented in FIG. 14.

The present invention is, of course, in no way restricted to the specific disclosure of the specification and drawings, but also encompasses any modifications within the scope of the appended claims.

What we claim is:

1. A pneumatic vehicle tire comprising:

a carcass with reinforcing members and radially inwardly positioned beads;

a tread strip with a tread, said tread strip positioned radially outwardly on said carcass;

an additional layer placed on the exterior of said tread strip for reinforcing flanks of said tread;

said additional layer made of a substance selected from the group consisting of rubber and thermoplastic;

said additional layer having a tensile modulus of elasticity greater than a tensile modulus of elasticity of said tread strip;

said additional layer including reinforcement elements selected from the group consisting of fibers, wires, and cords;

wherein said reinforcement elements in an unvulcanized state of said additional layer are arranged in a grouping selected from the group consisting of a zigzag arrangement, an irregular arrangement, a compressed zigzag arrangement, and a compressed irregular arrangement; and wherein said additional layer has a thickness that is 0.05 to 0.3 times a thickness of said tread strip.

2. A pneumatic vehichle tire according to claim 1, wherein said tread strip is comprised of a porous material.

3. A pneumatic vehicle tire according to claim 1, wherein said reinforcement elements of said additional layer are comprised of a heat-resistant and deformable material selected from the group consisting of organic material, inorganic material, and a mixture of organic and inorganic materials.

4. A pneumatic vehicle tire according to claim 3, wherein said additional layer further comprises at least one unvulcanized rubber core about which said reinforcement elements are wound in a grouping selected from the group consisting of a zigzag arrangement and a compressed zigzag arrangement.

5. A pneumatic vehicle tire according to claim 1, wherein said additional layer further comprises at least one unvulcanized rubber core about which said reinforcement elements are wound in a grouping selected from the group consisting of a zigzag arrangement and a compressed zigzag arrangement.

* * * * *